United States Patent [19]

Gaylord et al.

[11] Patent Number: 6,101,231

[45] Date of Patent: Aug. 8, 2000

[54] NUCLEAR FUEL BUNDLE SPACER SPRING FORCE MEASUREMENT SYSTEM

[75] Inventors: William B. Gaylord; William C. Peters; Charles F. Lang, all of Wilmington; David G. Smith, Leeland; David O. Sheppard; Edward G. Apple, Jr., both of Wilmington, all of N.C.

[73] Assignee: General Electric Company, Schenectady, N.Y.

[21] Appl. No.: 09/285,254

[22] Filed: Apr. 2, 1999

[51] Int. Cl.[7] ................................................ G21C 17/10
[52] U.S. Cl. ............... 376/245; 73/862.391; 73/862.393; 73/862.451; 73/161
[58] Field of Search ............................. 376/245; 73/161, 73/862.391, 862.393, 862.451

Primary Examiner—Charles T. Jordan
Assistant Examiner—K. Kevin Mun
Attorney, Agent, or Firm—Nixon & Vanderhye

[57] ABSTRACT

The spring force measurement system includes a draw rod standard, an insertion tube and an extension tube, together with a cable received through the tubes connecting the standard and a load cell, in turn connected by the cable to a winch. The draw rod standard is located in the fuel bundle below the spacer having a spring whose spring force is to be measured. By drawing the standard through the spacer cell, the spring force is computed using the measured tension in the connecting cable as the standard is withdrawn and the known values of the coefficient of friction between the spacer spring projection and the draw rod standard and the combined weight of the cable and draw rod standard. The measuring process is repeated for next higher spacers.

10 Claims, 11 Drawing Sheets

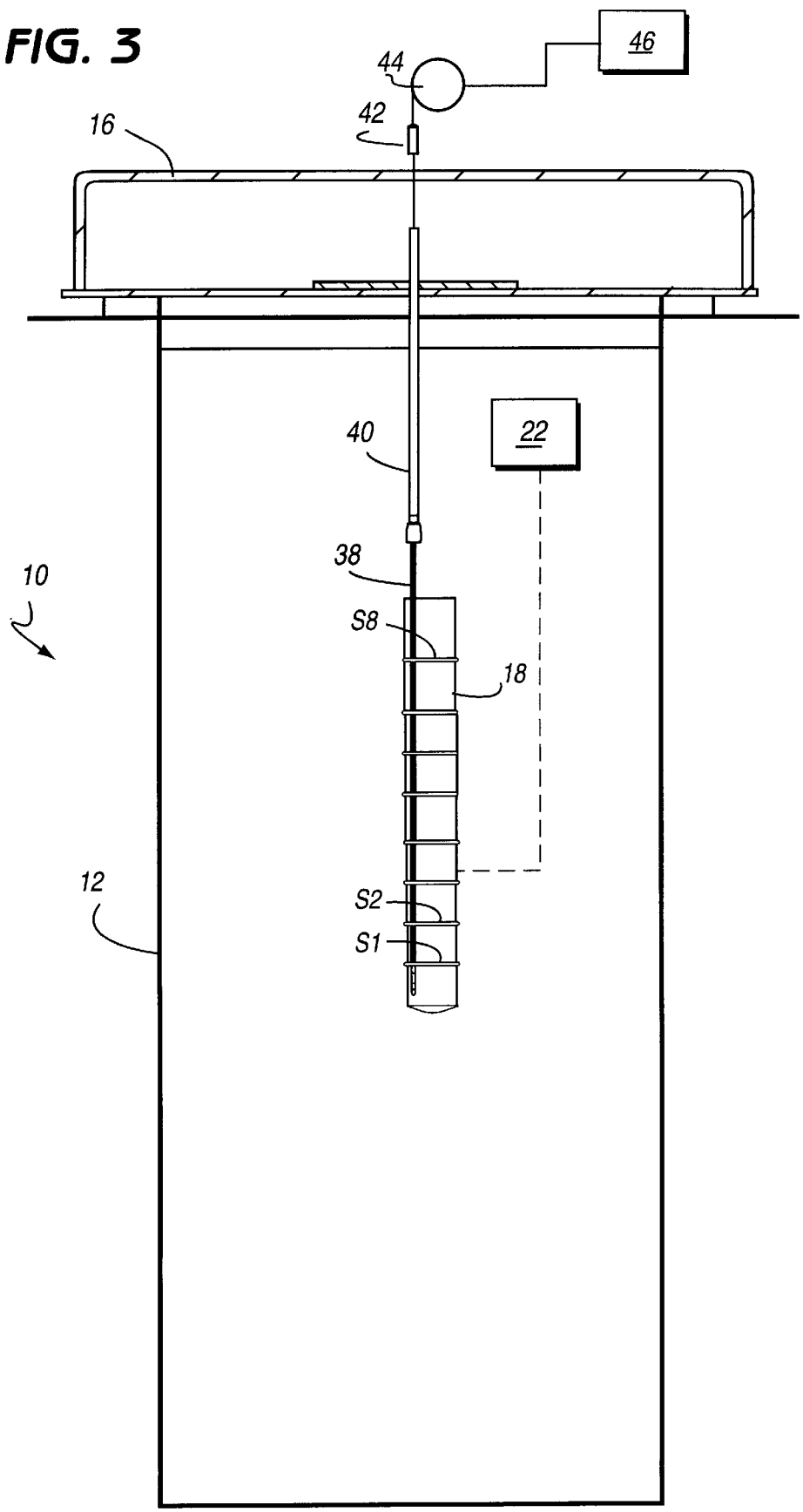

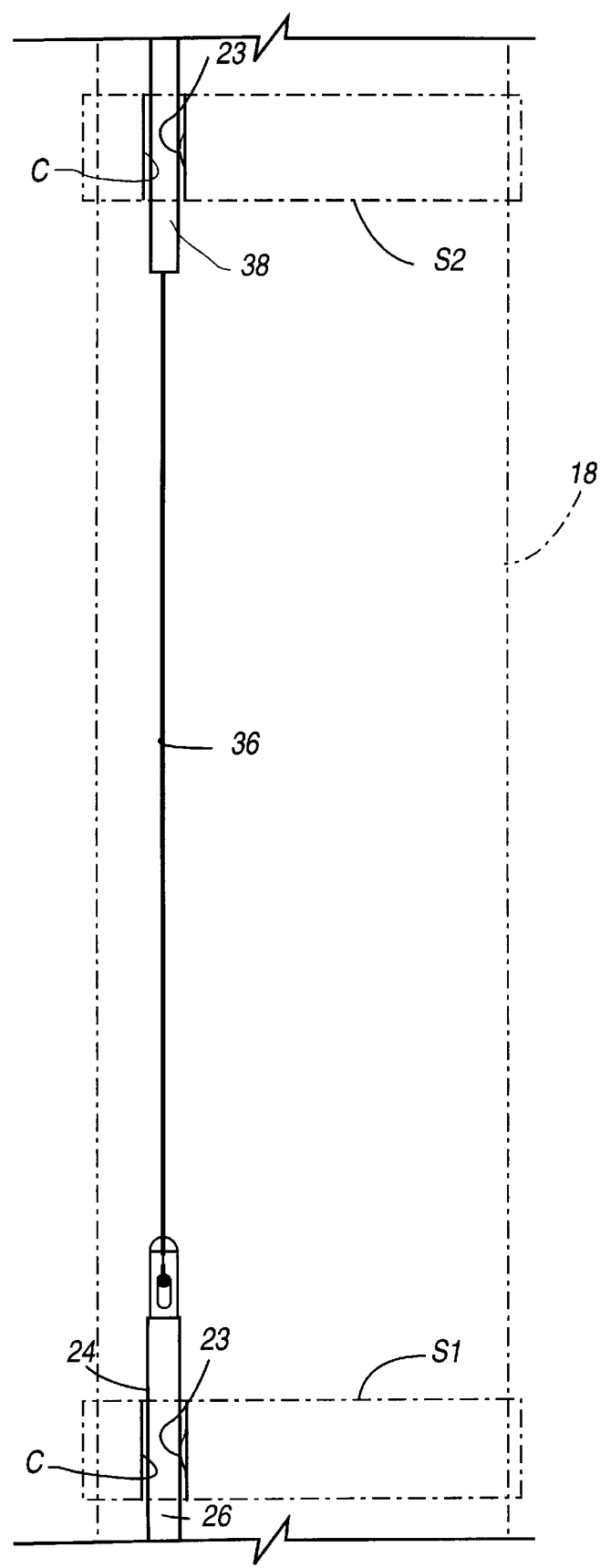

NUCLEAR FUEL BUNDLE SPACER SPRING FORCE MEASUREMENT SYSTEM

TECHNICAL FIELD

The present invention relates to a system for measuring the spring force of springs in the spacers of nuclear fuel bundles and particularly relates to a spacer spring force measuring system for measuring the force of springs in spacers in irradiated nuclear fuel bundles.

BACKGROUND OF THE INVENTION

In boiling water reactor (BWR) nuclear fuel bundles, fuel spacers are installed at fixed heights relative to a lower tie plate to maintain rod-to-rod spacing between the fuel rods from the top to the bottom of the bundle. That is, the spacers maintain the fuel rods in an ordered array within the fuel bundle, e.g., 9×9 or 10×10 arrays of fuel rods. A typical nuclear fuel bundle will contain seven or eight spacers held in place by tabs secured to one or more central water rods. Each spacer consists of a banded lattice of cells through which the fuel rods pass and which cells hold the fuel rods by contact between the fuel rod cladding and stops in the body of the cells and springs forming part of or assembled into the cells. These spacer springs impose a lateral force on each fuel rod, for example, in a range of 1.5 to 3.0 pounds for a newly-manufactured fuel bundle. After a full cycle of in-reactor burn-up, the spring forces are anticipated to be somewhat lower.

During manufacture and prior to assembly of the spacers into a fuel bundle, it is common practice to measure the spring forces on all of the springs using a spacer spring force measurement device. Such device is a gauge in the form of a plunger assembly containing a miniature compression load cell whose signal is monitored and interpreted in a data collection system. The gauge plunger assembly is inserted into each cell of the spacer and the load cell is capable of giving a measurement of the cell's spring force accurate to a few tenths of a pound.

The spacer spring force measurement devices used during manufacture of the spacers, however, cannot be made for measurements of spacer spring forces when the spacers are in the bundle or in irradiated fuel bundles due to the harsh radiation environment, thermal temperatures and water pressures that exist in a nuclear reactor core or storage pool. While in-bundle spacer spring measurements are desirable, formidable technical difficulties have remained. For example, spring force measurements for spacers in-bundle must be made with remote handling equipment due to the high radiation fields. The spacer springs are also not directly accessible in either irradiated or non-irradiated fuel bundles and the spring force measurement equipment for irradiated fuel must be designed to be remotely positioned, usually from the top of the bundle. Additionally, transducers such as load cells conventionally cannot withstand the harsh environment present in irradiated fuel bundles in fuel storage pools. Probes used in spring force measurements must also be designed so that they do not damage the spacers or the fuel bundle, e.g., misalignment of the probes can damage the spacers or spacer springs. Further, the accuracy of the spring force measurements must be comparable to that made for newly-manufactured spacers.

BRIEF SUMMARY OF THE INVENTION

In accordance with a preferred embodiment of the present invention, there is provided an in-bundle spacer spring force measurement system for measuring the spacer spring force in irradiated or non-irradiated nuclear fuel bundles. The spring force is determined by measuring the tension in a connecting cable used to withdraw a measuring or draw rod standard through the corresponding spacer cell, after the fuel rod has been removed from the cell. The spring force is measured for a single spacer cell at a time. A predetermined calibration curve of withdrawal force versus spacer spring force is used to compute the spacer spring force based on the following relationship:

$$\text{Withdrawal Force} = T_o + \mu \times \text{Spring Force},$$

where $T_o$ is the tension in the cable connected to the spring force draw rod standard needed to support the mass of the draw rod and cable, and $\mu$ is the coefficient of friction between the spacer spring projection and the draw rod standard.

The spring force is the force applied by the spacer spring to the draw rod standard in a lateral direction, i.e., perpendicular to the axes of the fuel rods of the fuel bundle. With the mass of the standard and cable, as well as the coefficients of friction being known, the withdrawal force can be measured with a load cell attached to the winch cable at a location above the fuel bundle, e.g., above a storage pool in the case of irradiated fuel bundles.

The draw rod standard per se includes an integral rod having fixed diameter segments separated by transition sections having gradual tapers from smaller to large diameters. The smallest diameter of the draw rod standard corresponds to the nominal fuel rod diameter and the other diameter or diameters will be slightly larger to permit slight compression of the spacer springs. In certain cases, segments may also be used with diameters slightly less than the nominal value of the fuel rod diameter. The presence of segments with outside diameters different from the nominal fuel rod diameter will allow comparison of the changes in the measured spring forces and permit an estimate of the spring constant.

The following is a brief description of a preferred embodiment of an in-bundle spring force measurement system hereof at a poolside storage area of an irradiated bundle, it being understood that the system can be applied to measure the spring forces of spacer springs in non-irradiated fuel bundles. The nuclear fuel bundle is brought into the storage pool and a fuel rod at the location of the spacer cells whose spring forces are to be measured is removed from the bundle. The draw rod standard is coupled to a cable which is inserted into an insertion tube having an outside diameter no greater than the nominal diameter of the fuel rods and which insertion tube is also connected to a standard extension tube. The cable exiting the extension tube is coupled to a load cell and is wound on a drum cable winch. With the extension and insertion tubes, as well as the draw rod standard forming essentially an elongated substantially rigid structure, and with the insertion tube and draw rod in the pool, the fuel bundle can be raised with the insertion tube/draw rod standard being received through the spacer cells vacated by the removed fuel rod until the standard is below the bottommost spacer whose spring force is to be measured. The insertion tube and draw rod standard are then disconnected by withdrawing the insertion tube, leaving the smaller diameter of the standard in the spacer cell whose spring force is to be measured. After disconnection, the insertion tube is elevated to the next higher spacer to avoid interference with the draw rod standard as it is withdrawn through the lower spacer by operation of the winch. As the standard is withdrawn through the spacer cell, withdrawal force data from the load cell is accumulated and analyzed by a computerized data acquisition system and the computed spring force and spring rate may be displayed upon completion of the measurement. After the measurement, the spring forces in higher spacer cells in the same cell lattice position may be measured. This is accomplished by indexing the fuel bundle in a downward direction so that the new spacer is at the same vertical location as the initial spacer. The spring force draw rod standard may then be positioned in this higher spacer similarly as previously described and drawn through the spacer cell with measurements being taken. After measuring the spring force of the cell in the highest spacer of the bundle, the standard is withdrawn from the bundle ready for new measurements to be taken.

In a preferred embodiment according to the present invention, there is provided in a nuclear fuel bundle having a plurality of generally parallel, axially extending fuel rods and spacers spaced from one another and including discrete spacer cells for holding the fuel rods in an ordered array thereof, the spacers having spacer springs for biasing the fuel rods in directions generally normal to the axes of said fuel rods, a method of measuring the spring force of the spacer springs, comprising the steps of passing a measuring rod standard through a spacer cell in contact with the spring, the spacer cell being void of a fuel rod, measuring the force necessary to pass the measuring rod standard through the spacer cell and determining the spring force from the measured force.

In a further preferred embodiment according to the present invention, there is provided in a nuclear fuel bundle having a plurality of generally parallel, axially extending fuel rods and spacers spaced from one another and including discrete spacer cells for holding the fuel rods in an ordered array thereof, the spacers having spacer springs for biasing the fuel rods in directions generally normal to the axes of said fuel rods, a method of measuring the spring force of the spacer springs, comprising the steps of suspending a measuring rod standard from a cable into the fuel bundle and below a selected spacer cell of a first spacer containing a spring whose spring force is to be measured, relatively moving the fuel bundle and the measuring rod standard to displace the measuring rod standard through the spacer cell thereby tensioning the cable, measuring the tension on the cable caused by displacement of the measuring rod standard through the cell and determining the spring force from the measured tension in the cable.

BRIEF DESCRIPTION OF THE DRAWINGS

FIG. 3 is a view similar to FIG. 1 illustrating the fuel bundle and draw rod standard in position for effecting an in-bundle spacer spring force measurement of the lower spacer of the fuel bundle;

FIG. 4A is a view similar to FIG. 3A illustrating the arrangement of the standard and insertion tube between the lowermost and next higher spacers;

DETAILED DESCRIPTION OF THE INVENTION

Figure 1:
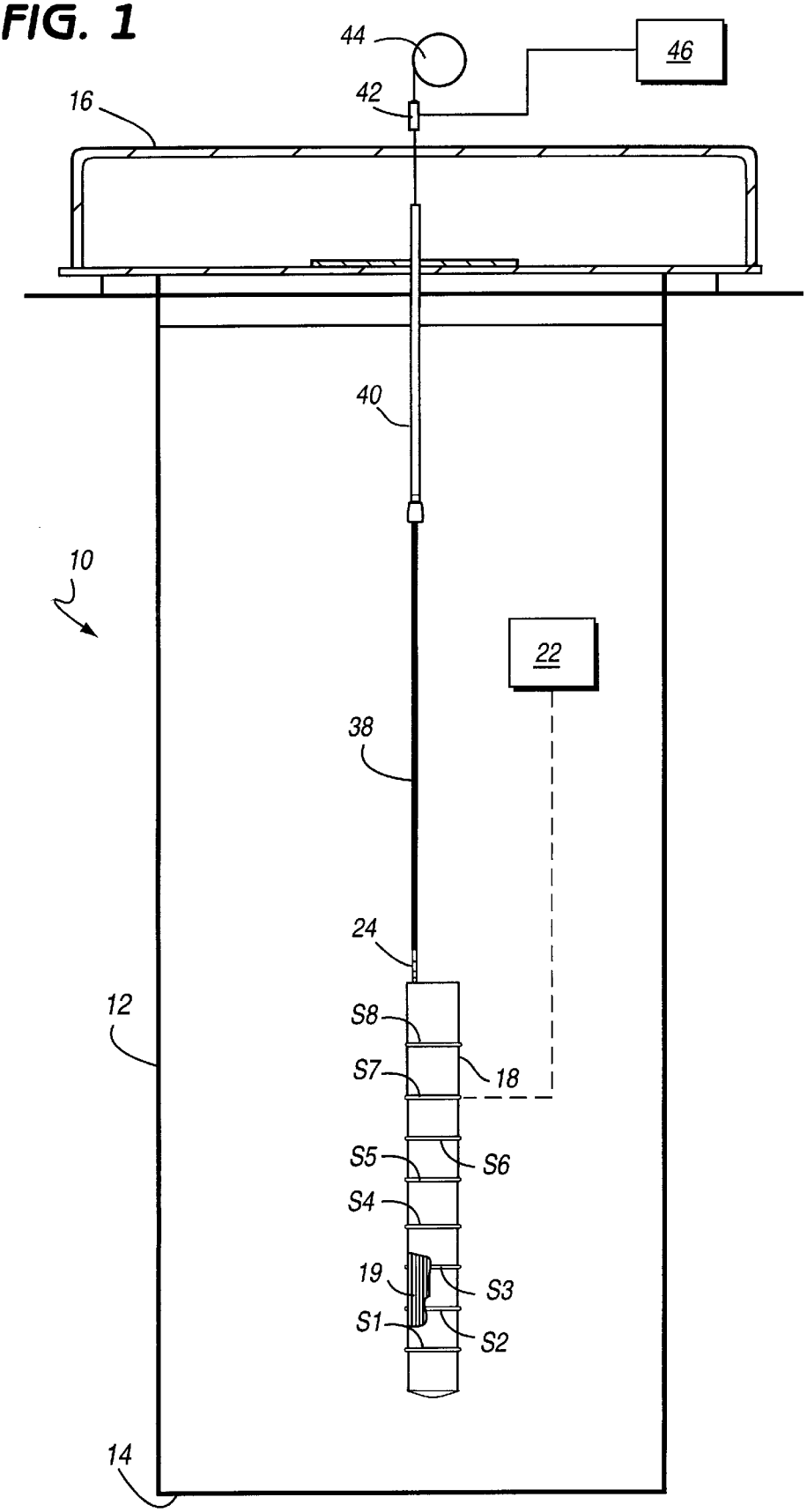
FIG. 1 is a schematic illustration of a nuclear fuel bundle storage pool illustrating an in-bundle spacer spring force measurement system in accordance with an embodiment of the present invention.

Referring now to FIG. 1, there is illustrated a nuclear storage pool, generally designated 10, having side walls 12, a bottom wall 14 and an upper opening along which a platform 16 is mounted. A fuel bundle 18 is illustrated in FIG. 1 in pool 10, it being appreciated that the fuel bundle comprises a plurality of nuclear fuel rods 19 in an ordered array with spacers S at axially spaced positions therealong maintaining the fuel rods in the array. The spacers at different elevations are indicated S1 . . . S8 starting adjacent the lower end of the bundle. Each spacer has a plurality of cells C, each cell containing a spring 23 (FIG. 3A) whose spring force is to be measured. The fuel bundle 18 is conventionally transported in the pool 10 and a suitable mechanism 22 may be coupled to the fuel bundle 18 for raising and lowering the bundle within pool 10.

Figure 2:
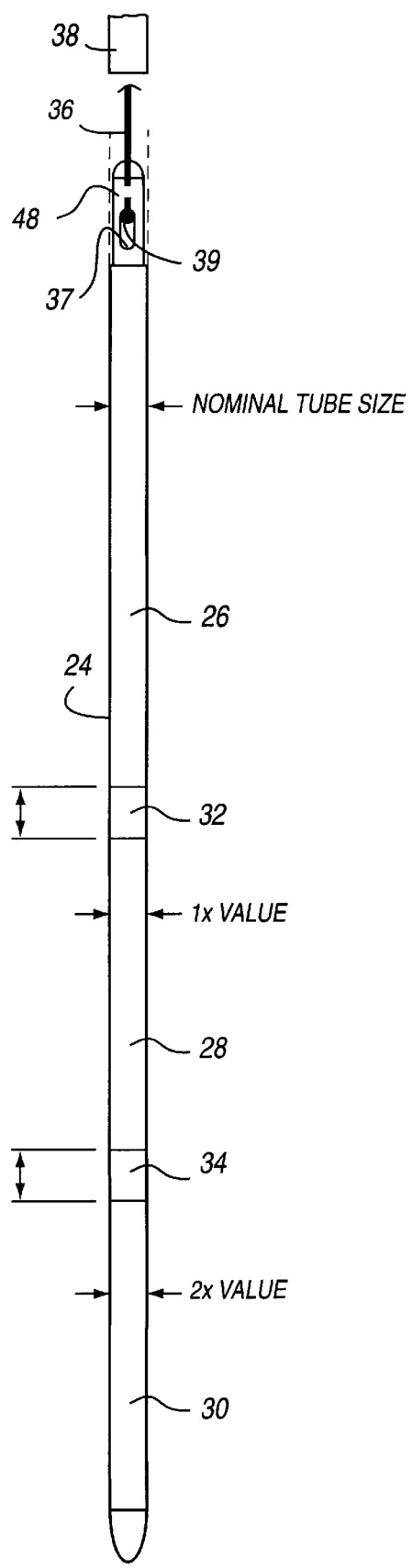
FIG. 2 is an enlarged side elevational view of a draw rod standard employed in the system hereof.
Figure 2A:
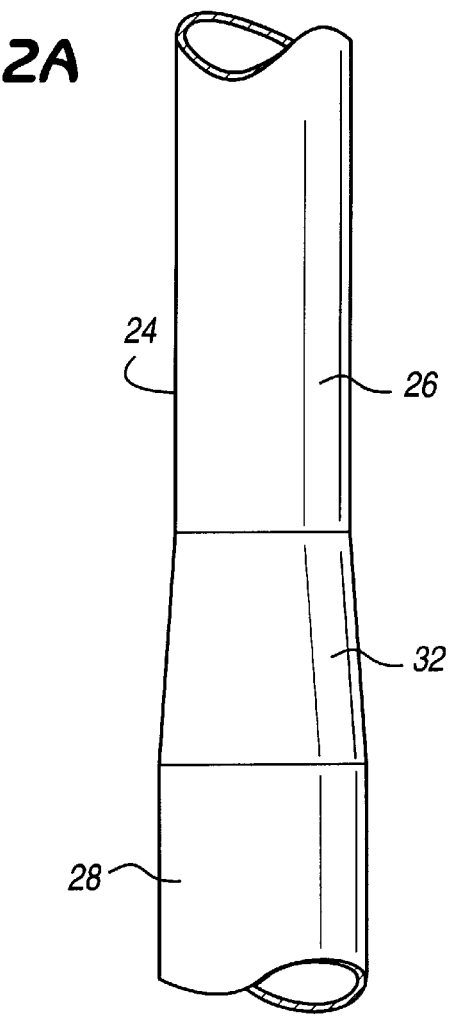
FIG. 2A is a fragmentary enlarged side elevational view with parts broken out for ease of illustration of the draw rod standard illustrated in FIG. 2, the draw rod standard being illustrated in exaggerated form to illustrate the change in diameters.
Figure 2A:
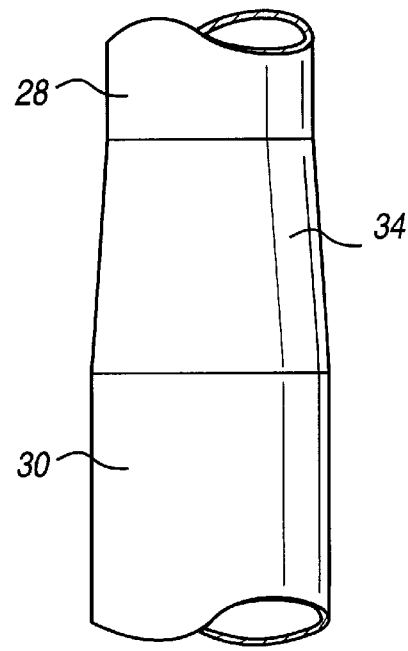

Referring to FIGS. 2 and 2A, the in-bundle spacer spring force measurement system of the present invention includes a draw rod standard 24. Standard 24 includes an elongated rod having a series of carefully calibrated fixed diameter segments along the length of the standard separated by transition areas having gradual tapers from smaller to larger outside diameters. For example, segment 26 has a diameter corresponding to the nominal diameter of the fuel rod. The next segment 28 has a diameter incrementally increased relative to the nominal diameter of segment 26, i.e., an increase of x beyond the nominal diameter. The third illustrated segment 30 has a nominal diameter 2x plus the nominal diameter of the segment 26, x being a fraction of the nominal diameter of segment 26. Additional segments may be provided as desirable. The segments are separated by transition sections 32 and 34 which have gradual tapers from the smaller to the larger diameter segments. The larger diameter segments are selected to permit slight compression of the spacer springs as the standard 24 is withdrawn through the cell in which the spring to be measured is located. The presence of different diameter segments enables comparison of the changes in the measured spring forces and an estimation of the spring constant. The upper end of the draw rod standard 24 has a key slot 37 for receiving a ball 39 at the end of a cable 36 whereby the standard 24 may be displaced upwardly and drawn through the spacer openings in sequence, as described below. The overall length of the draw rod standard is designed such that the draw rod standard can be withdrawn through a single spacer cell at a time without entering another spacer. Also, the lower end of the draw rod standard has a bullet nose to minimize or eliminate any damage to the spacer upon insertion or withdrawal of the draw rod standard relative to the fuel bundle.

Referring back to FIG. 1, the cable 36 passes through a rigid insertion tube 38 which, in turn, is coupled at its upper end to a standard rigid extension tube 40. The cable 36 continues through tube 40 and is coupled to a load cell 42. The cable is wound around a constant speed drum cable winch 44. The load cell 42 is connected to a computer data acquisition system 46 having an operating system and data acquisition software for receiving signals from the load cell 42. The loading on the cable as described below is measured by the load cell 42 and typically thousands of data loading measurements per second are taken as the draw rod standard is drawn through each spacer opening. Those measurements are statistically analyzed to give the withdrawal forces applicable to each segment of the draw rod standard and the different results from the different segments of the standard are analyzed to determine the spring rate, i.e., the spring force constant. The measured spring rate and withdrawal forces are used to determine the spacer cell spring force at the bundle design's nominal fuel rod diameter.

The insertion tube 38 is a hollow tube having the same outside diameter as the nominal diameter of the fuel rod for the bundle design being measured. A different insertion tube is therefore required for each different fuel design. As best illustrated in FIG. 2, the upper end of the standard 24 has a bullet nose 48 and the lower end of the insertion tube 38 is received over the bullet-shaped end 48 of the standard 24, as illustrated by the dashed lines. This enables the insertion tube and draw rod standard to be attached together for alignment and insertion into and withdrawal from the fuel bundle. However, the fit between the insertion tube 38 and standard 24 is not sufficient to lock the two components together, for reasons which will become apparent from the ensuing description. The extension tube 40 is a standard hollow aluminum stainless steel or Zircaloy tube which has threaded fittings for securement to the upper end of the insertion tube 38. A single design for the extension tube may be used for all bundle types since the extension tube does not enter the fuel bundle. At the top of the extension tube 40 is a clamping mechanism which enables the tube to be locked in place relative to the cable 36. This enables the insertion tube 38 and spring force draw rod standard 24 to be held together while they are moved up and down in the bundle. That is, the clamping device holds the insertion tube and draw rod together since the upper end of the insertion tube 38 is provided with a threaded end plug which screws into the threaded coupling on the lower end of the extension tube 40.

As noted previously, the spring force of the spring on the spacer in a particular opening is measured by measuring the tension in the cable employed to withdraw the standard through the spacer cell. The spring force can be computed from the following equation:

Withdrawal Force = $T_o + \mu \times$ Spring Force, where $T_o$ is the tension in the cable connected to the spring force draw rod standard needed to support the mass of the draw rod and cable, and $\mu$ is the coefficient of friction between the spacer spring projection and the draw rod standard.

Thus, with the withdrawal force being measured by the load cell 42, the weight of the cable and standard being known and the coefficient of friction likewise being known, the spring force can be ascertained.

Figure 3A:
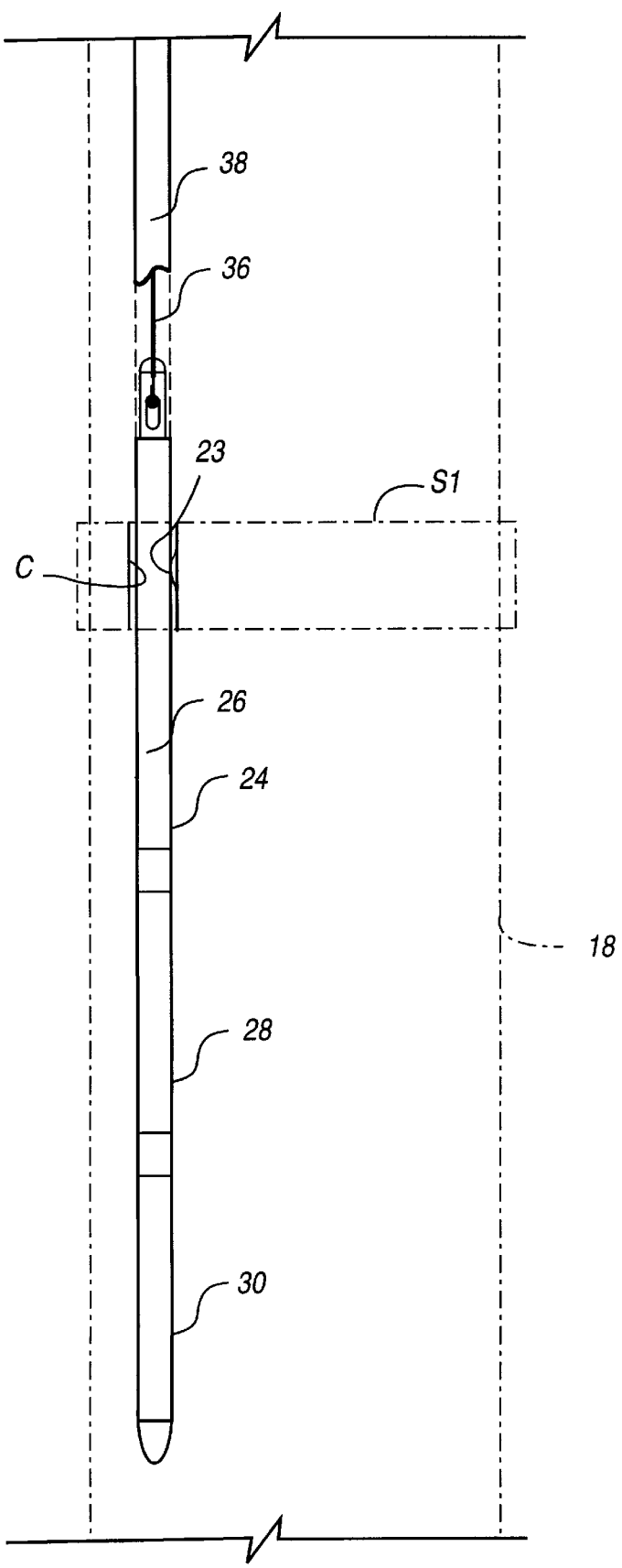
FIG. 3A is an enlarged schematic illustration of the draw rod standard in the lower spacer of the fuel bundle of FIG. 3.
Figure 4:
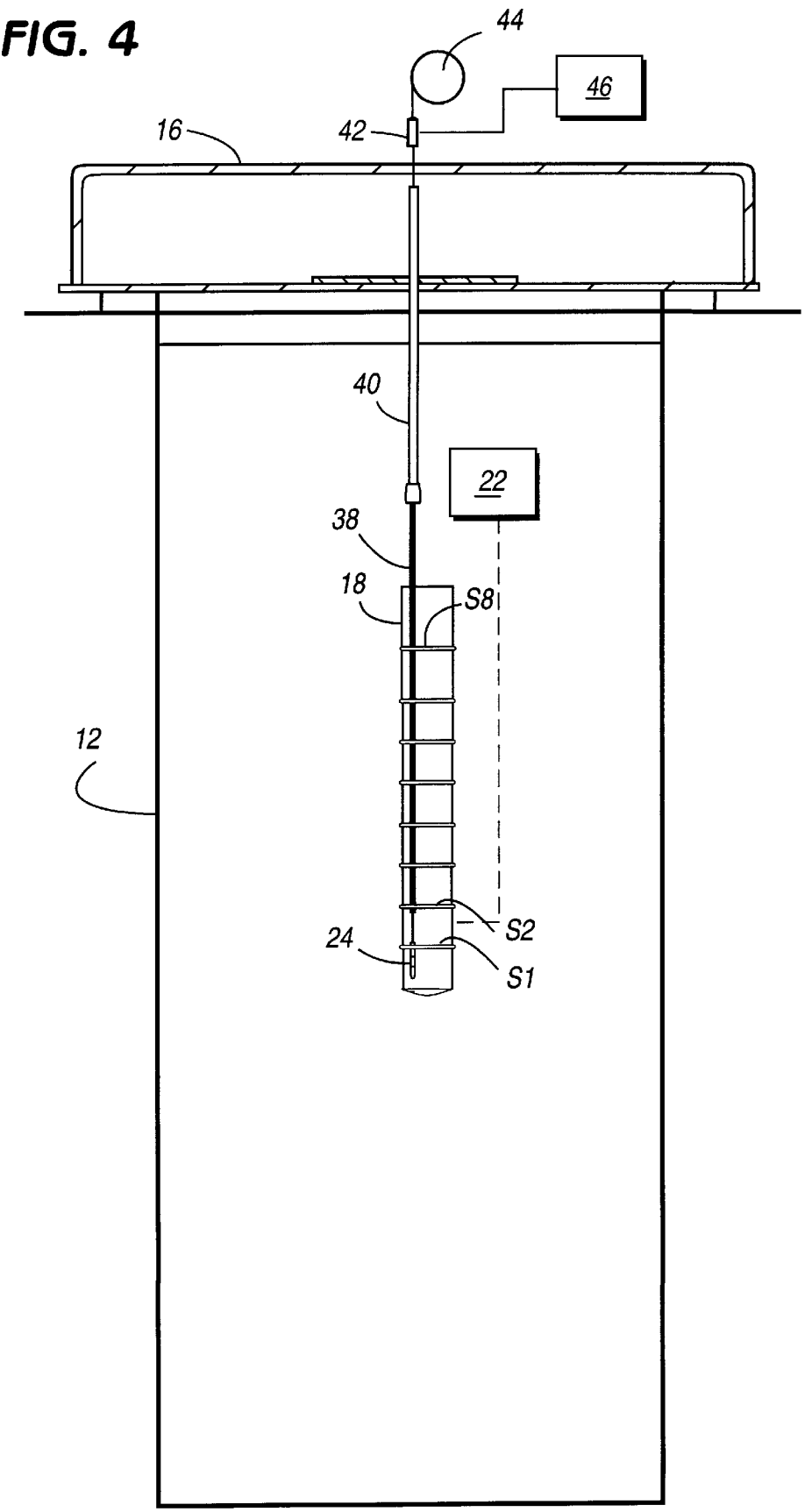
FIG. 4 is a view similar to FIG. 3 illustrating the withdrawal of the insertion tube from the standard to facilitate the spring force measurement in the lower spacer.

To employ the in-bundle spacer spring force measurement system hereof, the bundle 18 is moved into the pool 10 and a fuel rod at the location of the cells whose spring forces are to be measured is removed. As illustrated in FIG. 1, the elongated extension tube, insertion tube and draw rod standard combination are located over the cells vacated by the fuel rod and in which cells the spring forces of the springs are to be measured. The fuel bundle is then elevated relative to the force measurement system such that the draw rod standard is received within the bundle with the first segment 26 located within the lowermost spacer S1 having a spring whose spring force is to be measured as illustrated in FIGS. 3 and 3A. Suitable mechanisms, not shown, maintain the assembly of extension and insertion tubes and draw rod standard substantially fixed against vertical and lateral movement to enable reception of the insertion tube and draw rod standard within the bundle. Alternatively, the relative movements of the bundle and the assembly can be accomplished by moving one or the other of the assembly or bundle or both. As illustrated in FIGS. 4 and 4A, the extension tube and insertion tube are then drawn back leaving segment 26 of the standard located within the cell. The insertion tube 38 and extension tube 40 are drawn back to locate the lower end of the insertion tube 38 adjacent the next higher spacer to avoid interference with the standard as the standard is drawn through the lower spacer.

Figure 5:
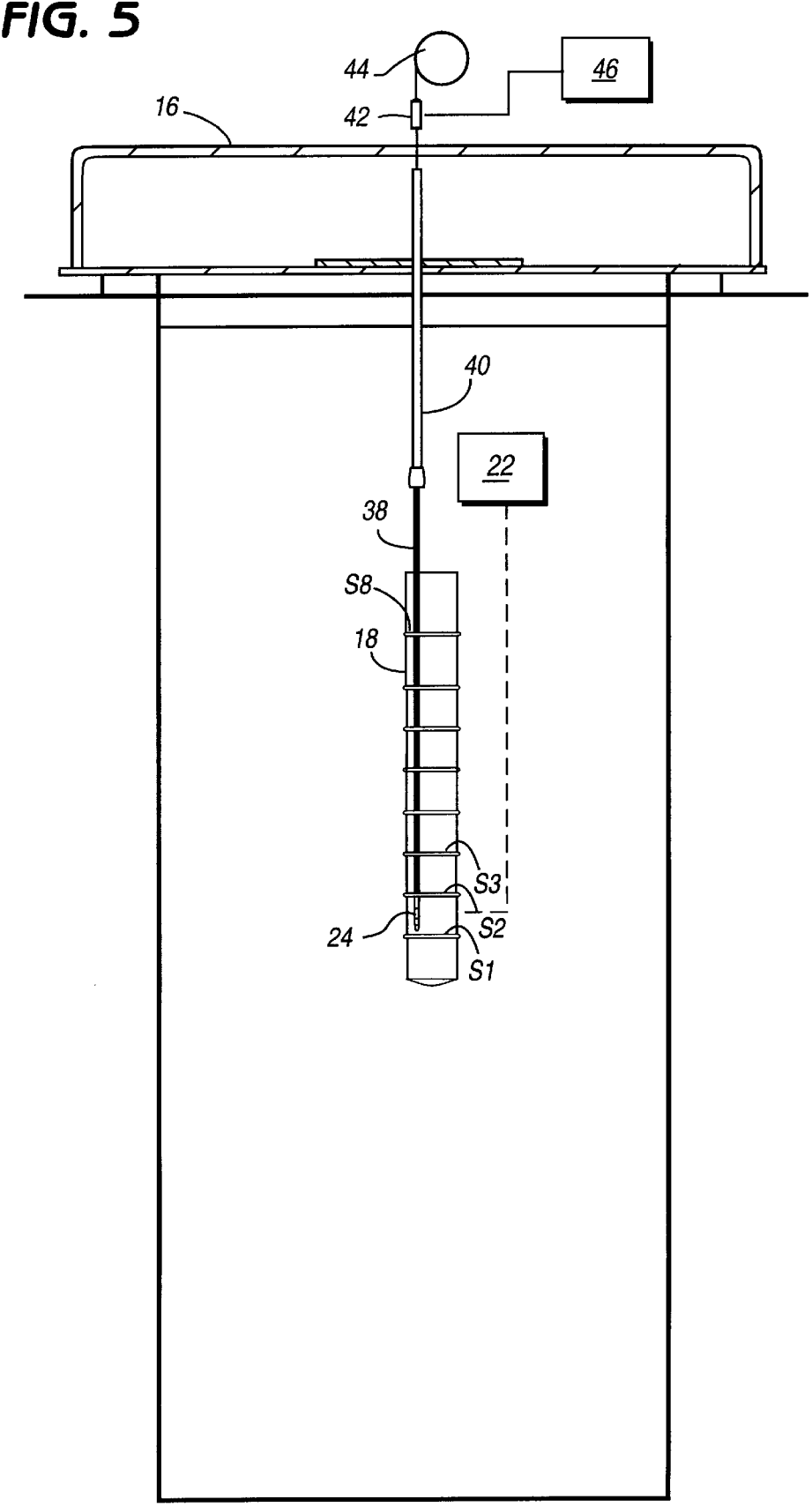
FIG. 5 is a view similar to FIG. 3 illustrating the draw rod standard in position for measuring the spring force of a spring in the next higher spacer.
Figure 5A:
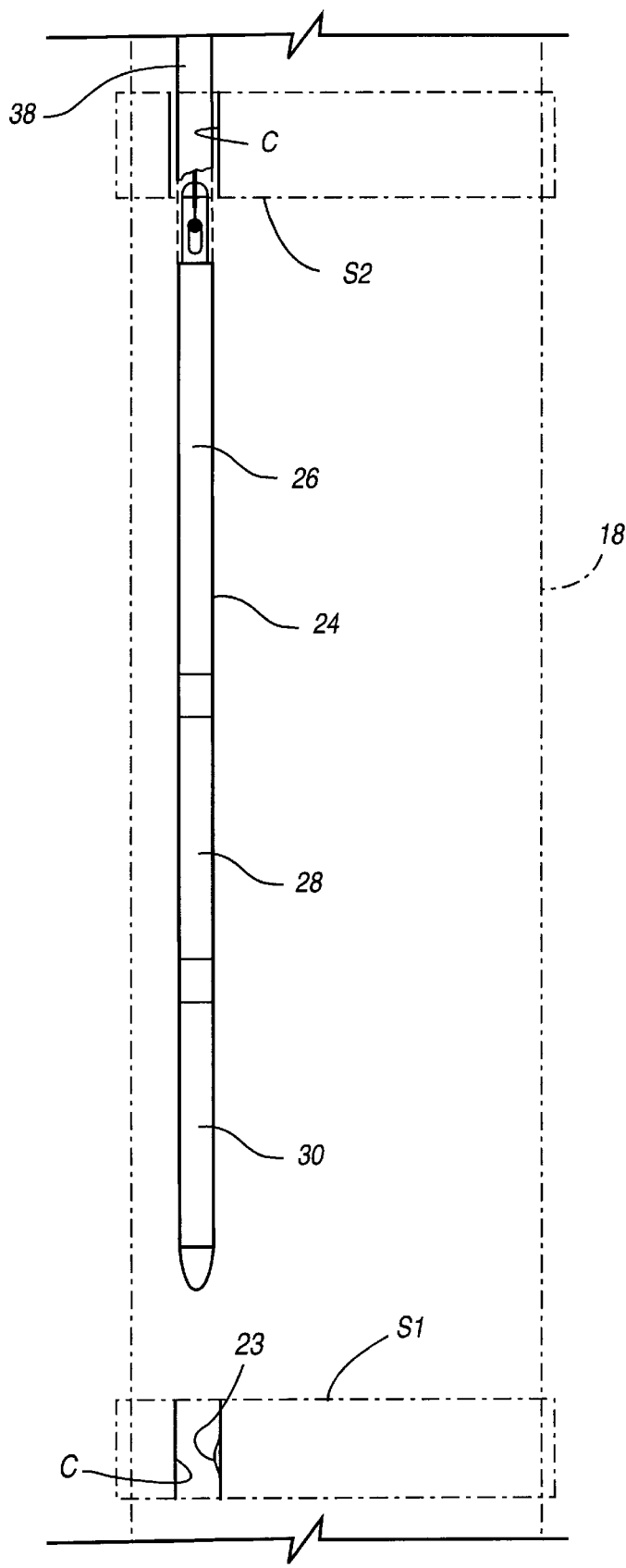
FIG. 5A is a schematic illustrating the position of the standard prior to measuring the spring force of the spring in the next higher spacer.

The drum 44 is then activated at constant speed and the draw rod standard is slowly raised through the cell of the lowermost spacer into the space between spacers S1 and S2 as illustrated in FIGS. 5 and 5A. Withdrawal force data from the load cell is accumulated and analyzed by the system 46 and the computed spring force and spring rate may be displayed upon completion of the measurement. After the first measurement is taken, the spring force of the spring of the next higher spacer cell in the bundle can be measured. This is accomplished by again engaging the bullet nose 48 of the draw rod standard within the lower end of the insertion tube 38. The fuel bundle and the force measurement system are relatively displaced, i.e., the fuel bundle is preferably lowered and the draw rod standard, insertion tube and extension tube combination is lowered to a lesser extent, to locate the upper end of the standard in the cell of the next higher spacer S2. The insertion tube and extension tube are then raised to the further higher spacer S3 to permit the draw rod to be withdrawn through the cell of spacer S2 with measurements being taken during withdrawal as described with respect to spacer S1.

Figure 6:
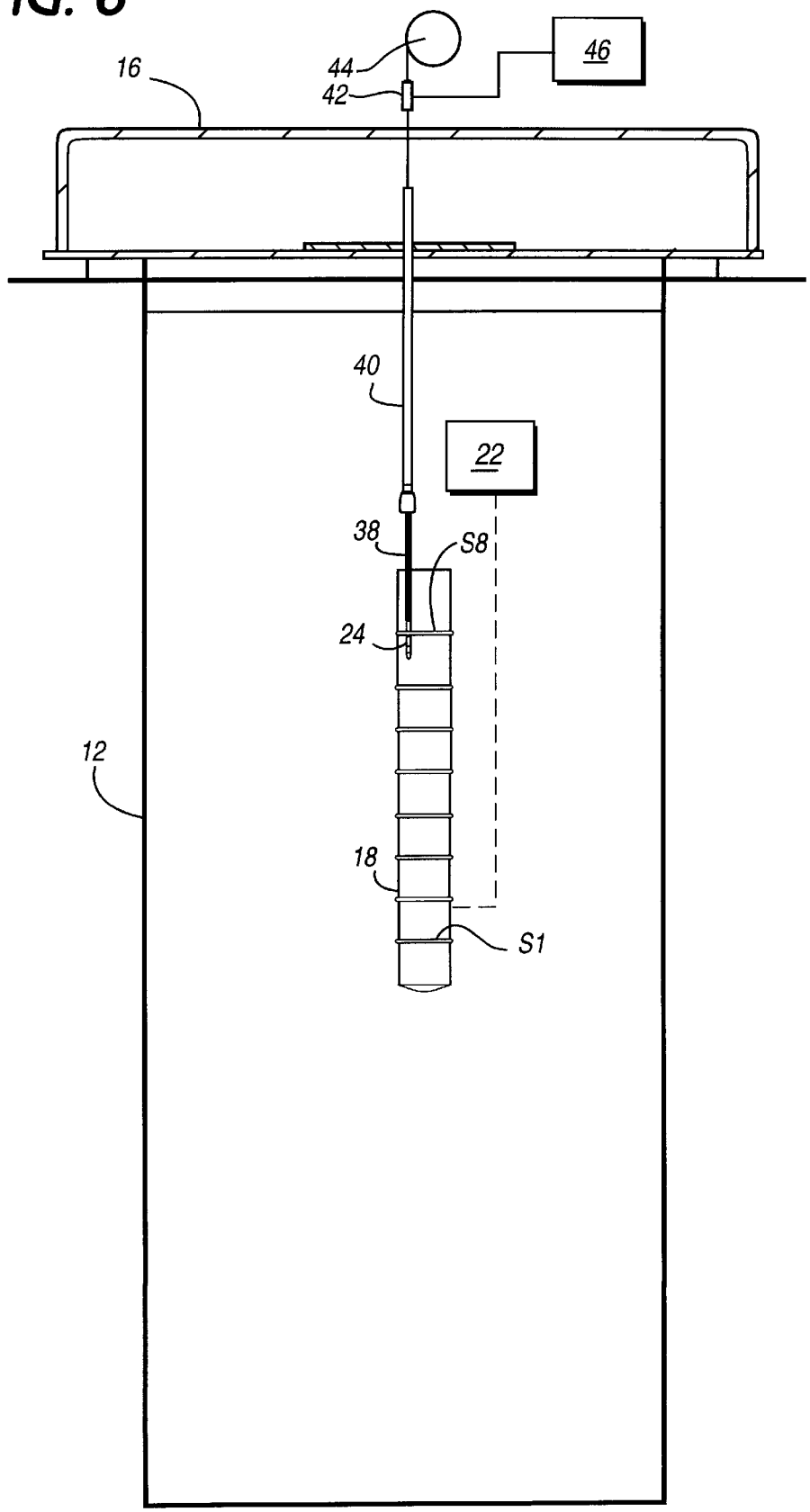
FIG. 6 is a view similar to FIG. 5 illustrating the relative positions of the fuel bundle and standard just prior to measuring the spring force of the spring in the highest spacer.
Figure 6A:
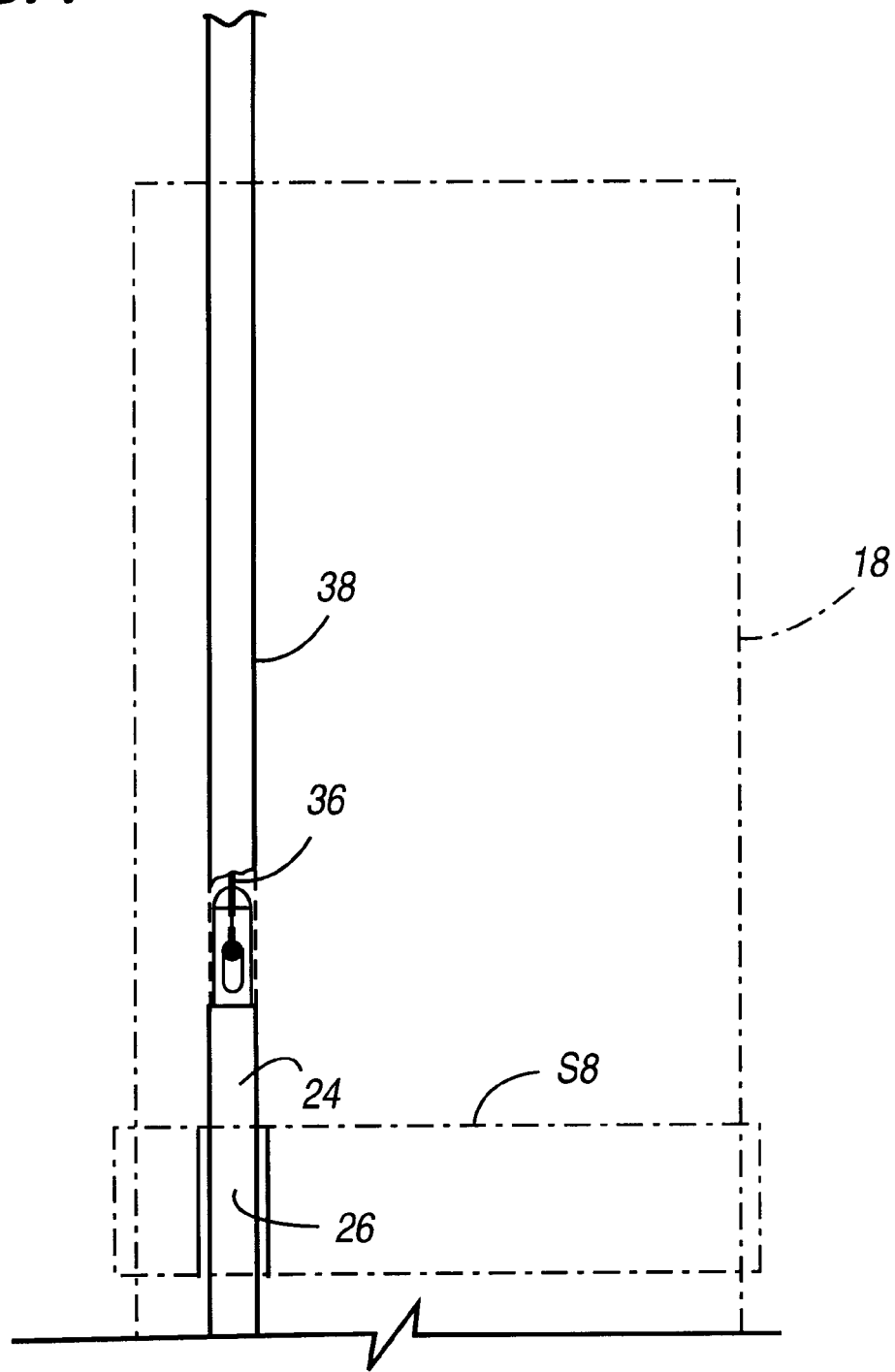
FIG. 6A is an enlarged schematic illustration of the arrangement illustrated in FIG. 6.

It will be appreciated that for additional measurements of the spring forces for springs in higher spacers, the method steps noted above are repeated with the bundle being indexed downwardly by the handling machine 22 so that each new spacer is disposed at essentially the same vertical location in the pool 12 as the lowermost spacer S1 was during the initial force measurements. When all of the measurements for the same fuel rod cell lattice location have been made, FIGS. 6 and 6A illustrating the final measurements being taken for spacer S8, the fuel rod originally removed can be reinstalled. The above-mentioned steps may then be repeated to determine spring forces in other cell lattice locations as desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel bundle having a plurality of generally parallel, axially extending fuel rods and spacers spaced from one another and including discrete spacer cells for holding the fuel rods in an ordered array thereof, the spacers having spacer springs for biasing the fuel rods in directions generally normal to the axes of said fuel rods, a method of measuring the spring force of the spacer springs, comprising the steps of:

passing a measuring rod standard through a spacer cell in contact with the spring, the spacer cell being void of a fuel rod;

measuring the force necessary to pass the measuring rod standard through the spacer cell; and determining the spring force from the measured force.

2. In a nuclear fuel bundle having a plurality of generally parallel, axially extending fuel rods and spacers spaced from one another and including discrete spacer cells for holding the fuel rods in an ordered array thereof, the spacers having spacer springs for biasing the fuel rods in directions generally normal to the axes of said fuel rods, a method of measuring the spring force of the spacer springs, comprising the steps of:

suspending a measuring rod standard from a cable into the fuel bundle and below a selected spacer cell of a first spacer containing a spring whose spring force is to be measured;

relatively moving the fuel bundle and the measuring rod standard to displace the measuring rod standard through the spacer cell thereby tensioning the cable;

measuring the tension on the cable caused by displacement of the measuring rod standard through the cell; and determining the spring force from the measured tension in the cable.

3. A method according to claim 2 including:

providing a measuring rod standard with a first diameter portion substantially corresponding to the diameter of the fuel rod and a second diameter portion larger than said first diameter portion to enable compression of the spring in the selected spacer cell; and compressing the spring in the selected spacer cell by passing the measuring rod standard through the spacer cell with the second diameter portion of the measuring rod standard in engagement with the spring.

4. A method according to claim 2 including:

locating the measuring rod standard below a second spacer next above said first spacer in the fuel bundle containing a second spacer cell whose spring force is to be measured;

displacing the measuring rod standard through the second cell;

after measuring the tension in the cable caused by displacing the measuring rod standard through the second cell, relatively moving the measuring rod standard and the fuel bundle to displace the measuring rod standard through a third spacer cell next above the second spacer cell;

measuring the tension on the cable caused by displacement of the measuring rod standard through said third spacer cell; and determining the spring force of the spring of said third spacer cell from the latter measured tension on the cable.

5. A method according to claim 2 including measuring the tension on the cable and determining the spring force from the measured tension for each spacer cell above the selected spacer cell having a spring whose spring force is to be measured by, for each said spacer cell above the selected spacer cell, relatively moving the fuel bundle and measuring rod standard to displace the measuring rod standard through the spacer cells.

6. A method according to claim 2 including:

passing the cable through a substantial rigid insertion tube prior to suspending the measuring rod standard in the fuel bundle;

releasably connecting the measuring rod standard to the insertion tube; and relatively moving the fuel bundle and measuring rod standard to displace the connected substantially rigid insertion tube and measuring rod standard through the spacer cells to locate the measuring rod standard below the selected spacer.

7. A method according to claim 6 including disconnecting the measuring rod standard and the insertion tube from one another prior to relatively moving the fuel bundle and measuring rod standard relative to one another to displace the measuring rod standard through the spacer cell.

8. A method according to claim 2 including supporting the measuring rod standard from a winch and locating a load cell on said cable for measuring the tension on the cable.

9. A method according to claim 2 including:

providing a measuring rod standard with a first diameter portion substantially corresponding to the diameter of the fuel rod and a second diameter portion larger than said first diameter portion to enable compression of the spring in the selected spacer cell;

compressing the spring in the selected spacer cell by passing the measuring rod standard through the spacer cell with the second diameter portion of the measuring rod standard in engagement with the spring;

locating the measuring rod standard below a second spacer in the fuel bundle containing a second selected spacer cell whose spring force is to be measured;

displacing the measuring rod standard through the second selected cell;

after measuring the tension in the cable caused by displacing the measuring rod standard through the second selected cell, relatively moving the measuring rod standard and the fuel bundle to displace the measuring rod standard through a third spacer cell above the second spacer cell;

measuring the tension on the cable caused by displacement of the measuring rod standard through said third spacer cell; and determining the spring force of the spring of said third spacer cell from the latter measured tension on the cable.

10. A method according to claim 2 including:

providing a measuring rod standard with a first diameter portion substantially corresponding to the diameter of the fuel rod and a second diameter portion larger than said first diameter portion to enable compression of the spring in the selected spacer cell;

compressing the spring in the selected spacer cell by passing the measuring rod standard through the spacer cell with the second diameter portion of the measuring rod standard in engagement with the spring; and measuring the tension on the cable and determining the spring force from the measured tension for each spacer cell above the selected spacer cell having a spring whose spring force is to be measured by, for each said spacer cell above the selected spacer cell, relatively moving the fuel bundle and measuring rod standard to displace the measuring rod standard through the spacer cells.

\* \* \* \* \*

UNITED STATES PATENT AND TRADEMARK OFFICE
CERTIFICATE OF CORRECTION

PATENT NO. : 6,101,231
DATED : Aug. 8, 2000
INVENTOR(S) : William B. Gaylord, William C. Peters, Charles F. Lang (sic), David G. Smith, David O. Sheppard, Edward G. Apple It is certified that error appears in the above-identified patent and that said Letters Patent is hereby corrected as shown below:

There is a typographical error on the Patent Record for Inventor Charles F. Lang (sic). The correct spelling of the Inventor's name is:

Charles F. Laing

Signed and Sealed this

Twelfth Day of June, 2001

*Attest:*

*Attesting Officer*

NICHOLAS P. GODICI
*Acting Director of the United States Patent and Trademark Office*